United States Patent [19]
Weng

[11] Patent Number: 6,011,661
[45] Date of Patent: Jan. 4, 2000

[54] OPTICAL HOLDER FOR AN OPTICAL APPARATUS

[76] Inventor: Leo Weng, 7F, No. 1 Lane 59, Yu-Shen Street, Shih-Lin Dist., Taipei, Taiwan

[21] Appl. No.: 09/055,747

[22] Filed: Apr. 7, 1998

[51] Int. Cl.[7] .................................................... G02B 7/02
[52] U.S. Cl. ........................................... 359/819; 359/827
[58] Field of Search ................................... 359/819, 811, 359/820, 827; 353/100; 362/465; 396/533

[56] References Cited

U.S. PATENT DOCUMENTS

| | | | |
|---|---|---|---|
| 2,684,611 | 7/1954 | Hinden | 359/825 |
| 3,587,422 | 6/1971 | Kilgus | 359/827 |
| 3,625,596 | 12/1971 | Lange | 359/819 |
| 3,682,069 | 8/1972 | Lecoeur | 396/533 |
| 5,757,559 | 5/1998 | Nomura | 359/819 |

*Primary Examiner*—Ramon O. Ramirez
*Assistant Examiner*—Gwendolyn Baxter
*Attorney, Agent, or Firm*—Rosenberg, Klein & Lee

[57] ABSTRACT

An improved optical holder having a cylindrical, threaded front chamber raised from a front side thereof, a locating hole perpendicularly disposed in communication with the threaded front chamber into which a tightening up screw is threaded to hold down a focusing lens assembly in the threaded front chamber, a CCD mounting chamber at a rear side thereof in alignment with the threaded front chamber for holding a CCD (charge coupled device), a plurality of annular flanges raised one behind another between the CCD mounting chamber and the threaded front chamber for eliminating the interference of reflected and refracted light, a window aligned between the annular flanges and the CCD mounting chamber, a color filter chamber disposed between the annular flanges and the window for holding a color filter, and a mounting leg in one corner of the rear side of the optical holder for fitting into a pin hole on a circuit board on which the CCD is mounted, for permitting the CCD to be fitted into the CCD mounting chamber in alignment with the window.

2 Claims, 5 Drawing Sheets

OPTICAL HOLDER FOR AN OPTICAL APPARATUS

BACKGROUND OF THE INVENTION

The present invention relates to an optical holder for an optical apparatus for example a magnetic video camera, and more particularly to an improved optical holder which automatically keeps the CCD in position after its installation and, which effectively eliminates the interference of reflected and refracted light.

FIGS. 4 and 5 show an optical holder for an optical image pick-up device according to the prior art. This structure of optical holder 4 comprises a cylindrical, threaded front chamber 41 raised from the center of the front side thereof for holding a focusing lens assembly, a rear CCD chamber 42 at the center of the rear side thereof in alignment with the threaded front chamber 41 for holding a CCD (charge coupled device), and two screw holes 43 equally spaced from the rear CCD chamber 42 into which screws are threaded to secure the circuit board of the CCD in place. This structure of optical holder has drawbacks. Because the rear CCD chamber 42 is greater than the size of the CCD used, the alignment between the focusing lens assembly and the CCD must be carefully calibrated during the installation of the CCD. Because the inner diameter of the threaded front chamber 41 is equal to and longitudinally aligned with the inner diameter of the rear CCD chamber 42, interference of reflected or refracted light cannot be eliminated. Furthermore, this structure of optical holder is not suitable for use with a CCD for color exposure because the optical holder has no space for holding a color filter.

SUMMARY OF THE INVENTION

The present invention has been accomplished to provide an optical holder which eliminates the aforesaid drawbacks. According to one aspect of the present invention, the optical holder comprises a cylindrical, threaded front chamber raised from a front side thereof, a locating hole perpendicularly disposed in communication with the threaded front chamber into which a tightening up screw is threaded to hold down a focusing lens assembly in the threaded front chamber, a CCD mounting chamber at a rear side thereof in alignment with the threaded front chamber for holding a CCD (charge coupled device), a plurality of annular flanges raised one behind another between the CCD mounting chamber and the threaded front chamber for eliminating the interference of reflected and refracted light, a window aligned between the annular flanges and the CCD mounting chamber, a color filter chamber disposed between the annular flanges and the window for holding a color filter, and a mounting leg in one corner of the rear side of the optical holder for fitting into a pin hole on a circuit board on which the CCD is mounted, for permitting the CCD to be fitted into the CCD mounting chamber in alignment with the window. Because the CCD is automatically set into accurate alignment with the window, it is not necessary to calibrate the alignment between the CCD and the window. According to another aspect of the present invention, a color filter can be optionally installed subject to the type of the CCD used.

DETAILED DESCRIPTION OF THE PREFERRED EMBODIMENT

Figure 1:
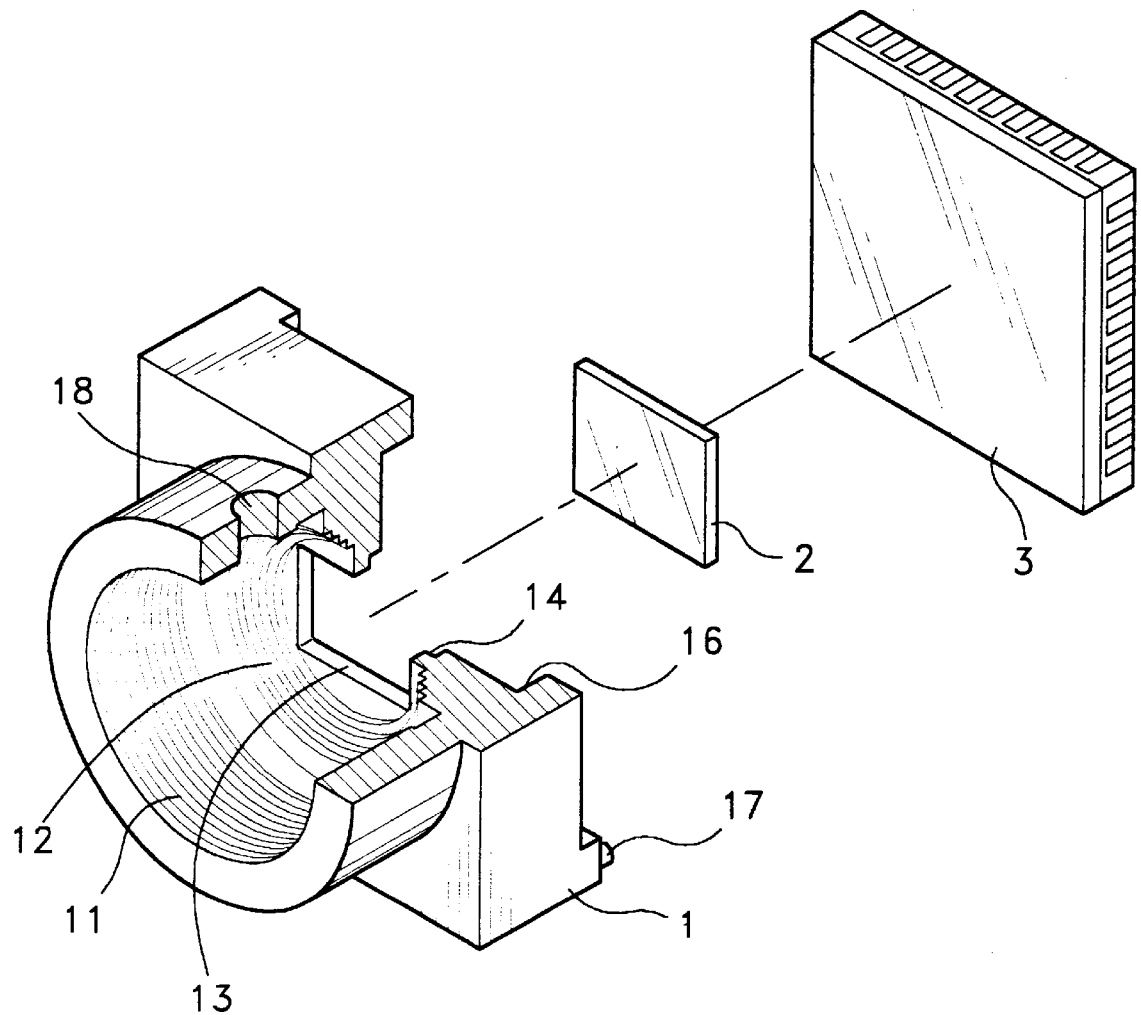
FIG. 1 is a cutaway of an optical holder according to the present invention.
Figure 3:
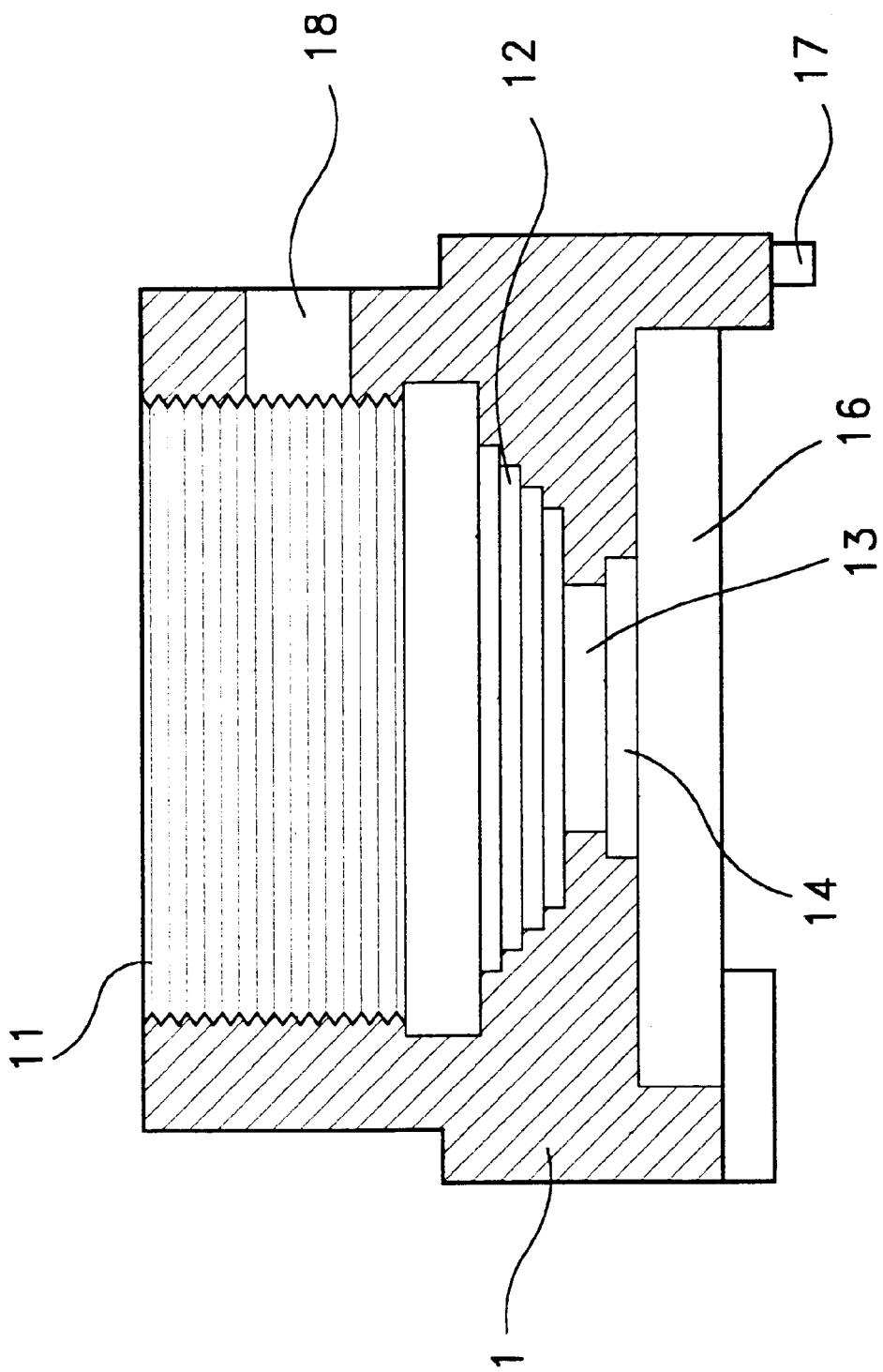
FIG. 3 is a sectional view taken along line A—A of FIG. 2.
Figure 4:
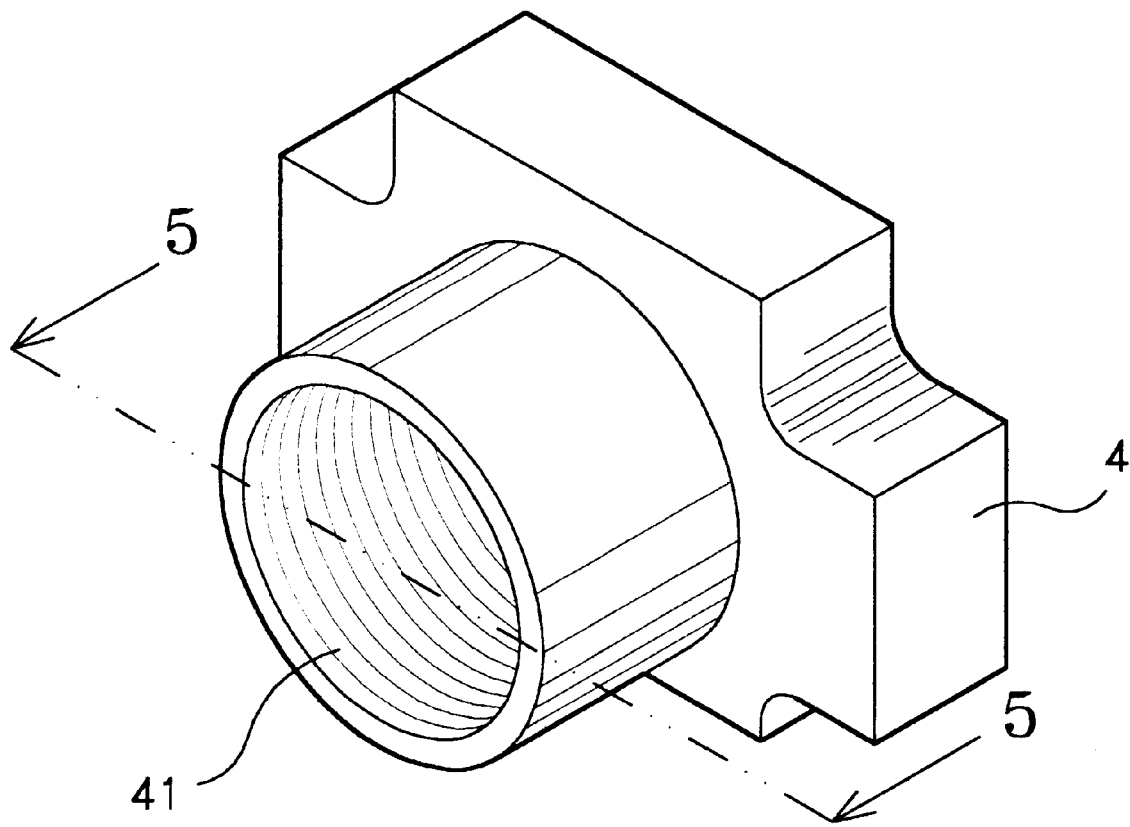
FIG. 4 is a perspective view of an optical holder according to the prior art.
Figure 5:
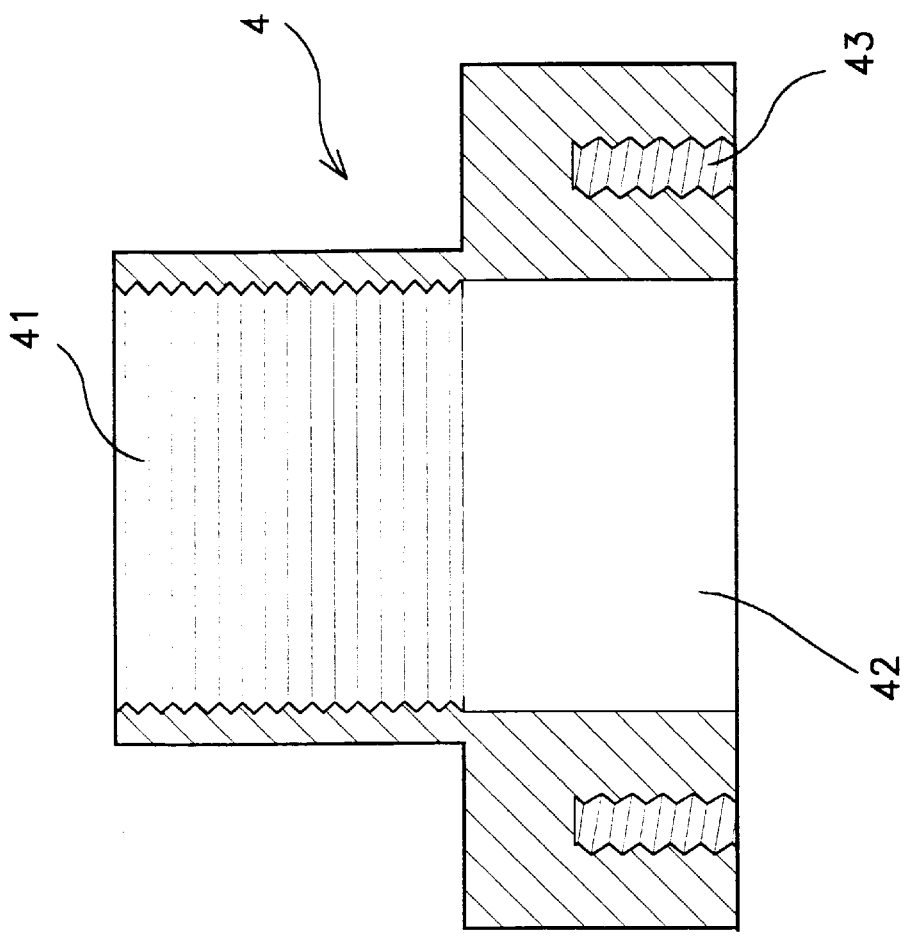
FIG. 5 is a sectional view taken along line B—B of FIG. 5.

Referring to FIGS. 1 and 3, the optical holder, referenced by 1, is a hollow member comprising a cylindrical, threaded front chamber 11 raised from a front side thereof, a locating hole 18 perpendicularly disposed in communication with the threaded front chamber 11 into which a tightening up screw is threaded to hold down a focusing lens assembly in the threaded front chamber 11, a CCD mounting chamber 16 at a rear side thereof in alignment with the threaded front chamber 11 for holding a CCD (charge coupled device) 3, a plurality of annular flanges 12 raised one behind another between the CCD mounting chamber 16 and the threaded front chamber 11, a window 14 aligned between the annular flanges 12 and the CCD mounting chamber 11, a color filter chamber 14 disposed between the annular flanges 12 and the window 13 for holding a color filter 2, and a mounting leg 17 in one corner of the rear side.

Figure 2:
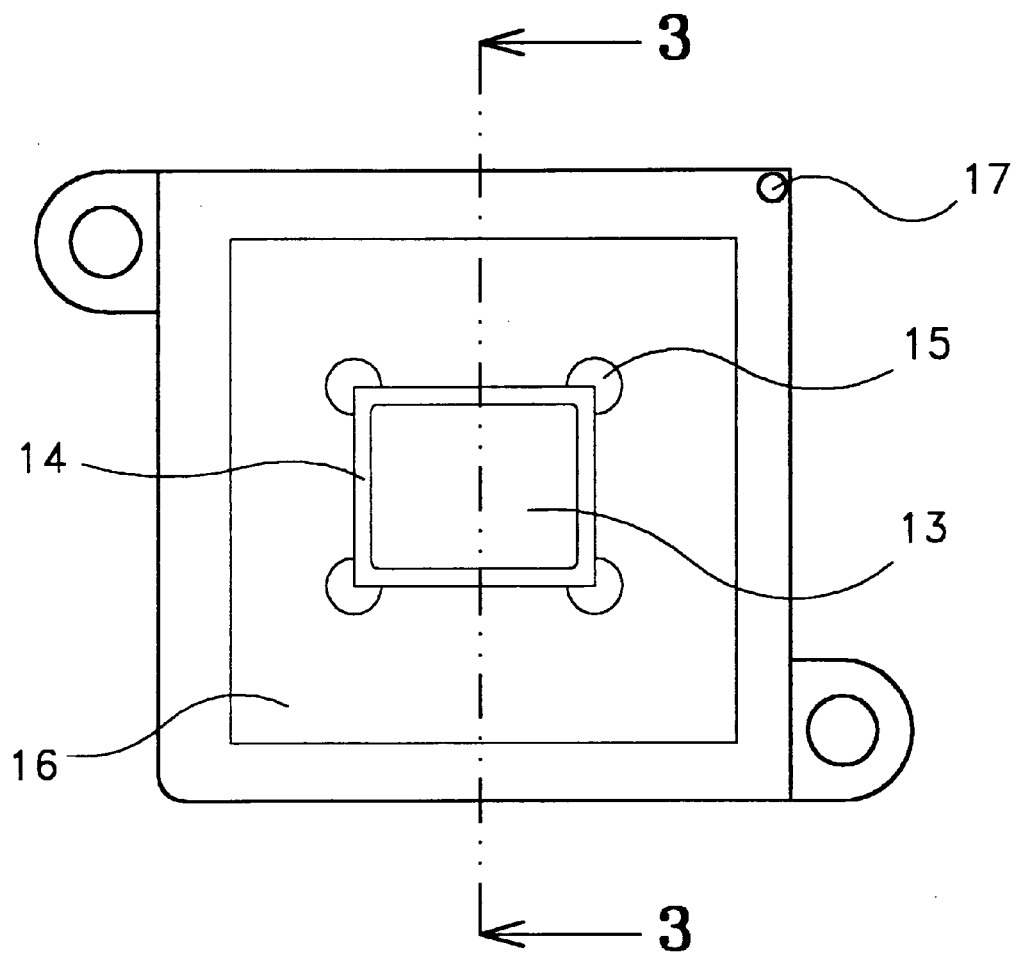
FIG. 2 is a bottom view of the optical holder shown in FIG. 1.

Referring to FIG. 2, sealing holes 15 are provided in four corners in communication between the CCD mounting chamber 16 and the color filter chamber 14. After the color filter 2 has been mounted in the color filter chamber 14, glue or adhesive is filled in the sealing holes 15 to fixedly secure the color filter 2 in place without affecting the color filtration function of the color filter 2. The CCD 3 is fixedly mounted on a circuit board having a pin hole corresponding to the mounting leg 17 on the optical holder 1. By fastening the mounting leg 17 to the pin hole on the circuit board, the CCD 3 is fitted into the CCD mounting chamber 16 in accurate alignment with the window 13, enabling the image of the object to be focused by the focusing lens onto the CCD 3 through the color filter 2. Further, the annular flanges 12 effectively eliminate reflected light as well as refracted light.

The aforesaid CCD 3 is used with the color filter 2 for color exposure. The color filter 2 is eliminated when a monochromatic CCD is used.

What the invention claimed is:

1. An improved optical holder of the type comprising a cylindrical, threaded front chamber raised from a front side thereof, and a locating hole perpendicularly disposed in communication with said threaded front chamber into which a tightening up screw is threaded to hold down a focusing lens assembly in said threaded front chamber, the improvement comprising a CCD mounting chamber at a rear side of the optical holder in alignment with said threaded front chamber for holding a CCD (charge coupled device), a plurality of annular flanges raised one behind another between said CCD mounting chamber and said threaded front chamber for eliminating the interference of reflected and refracted light, a window aligned between said annular flanges and said CCD mounting chamber, a color filter chamber disposed between said annular flanges and said window for holding a color filter, and a mounting leg in one corner of the rear side of the optical holder for fitting into a pin hole on a circuit board on which said CCD is mounted, for permitting said CCD to be fitted into said CCD mounting chamber in alignment with said window.

2. The improved optical holder of claim 1, wherein a plurality of sealing holes are provided in four corners in communication between said CCD mounting chamber and said color filter chamber into which glue means is filled to fix a color filter in said color filter chamber.

* * * * *